(No Model.)
J. HORAN.
DEVICE FOR SUPPORTING PLANTS.
No. 565,540. Patented Aug. 11, 1896.
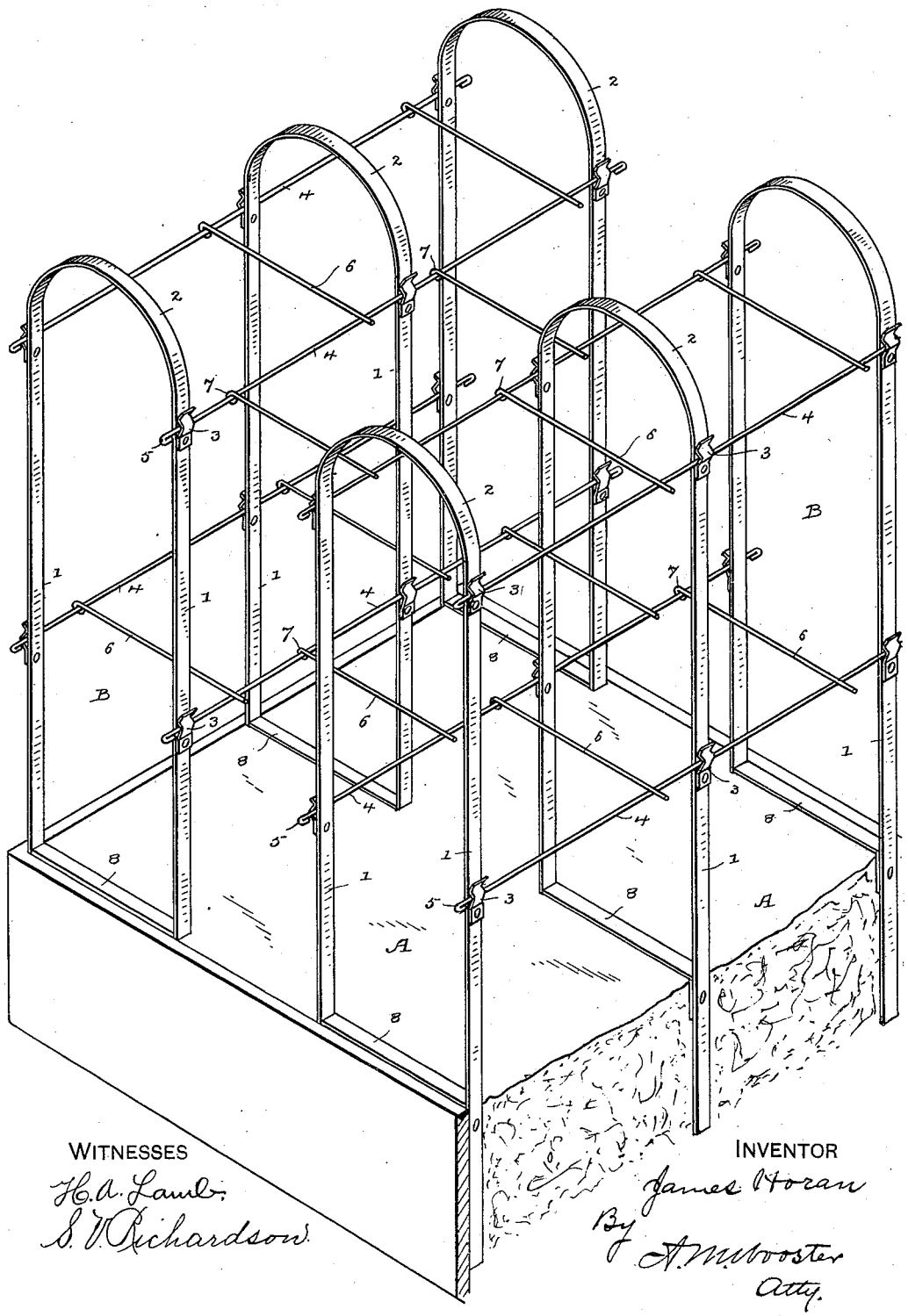
WITNESSES
INVENTOR

UNITED STATES PATENT OFFICE.

JAMES HORAN, OF BRIDGEPORT, CONNECTICUT.

DEVICE FOR SUPPORTING PLANTS.

SPECIFICATION forming part of Letters Patent No. 565,540, dated August 11, 1896.

Application filed May 23, 1896. Serial No. 592,696. (No model.)

*To all whom it may concern:*

Be it known that I, JAMES HORAN, a citizen of the United States, residing at Bridgeport, in the county of Fairfield and State of Connecticut, have invented certain new and useful Improvements in Devices for Supporting Plants; and I do hereby declare the following to be a full, clear, and exact description of the invention, such as will enable others skilled in the art to which it appertains to make and use the same.

My invention has for its object to provide a device for supporting plants, for example, carnations, which will meet the necessary requirements of supporting either large or small plants on all sides, will be adapted to beds of any size, and will be inexpensive and durable, so that it may be used year after year.

With these ends in view I have devised the novel device for supporting plants, of which the following description, in connection with the accompanying drawing, is a specification, numbers being used to designate the several parts.

The drawing is a perspective illustrating the use of my novel supporting device.

A indicates the bed, which may contain carnations or other plants.

My novel support consists, essentially, of a series of uprights B, each upright comprising two side pieces 1 and a top cross-piece 2. These uprights are preferably made of single strips of sheet metal, which may be either "galvanized," so-called, or japanned or painted, and are simply formed to shape by bending the two sides parallel, leaving the top cross-piece curved. Each upright in use therefore is practically an inverted U. Upon the outer sides of these cross-pieces I rivet or otherwise firmly secure clips 3, preferably made of spring metal. These clips are placed in a line with and equidistant from each other and serve to hold in place longitudinal rods 4. The ends of these rods are turned backward upon themselves, as at 5, so as to form stops to prevent the rods from slipping out in use.

6 denotes transverse rods, each of which is provided with an eye 7 at one end, through which a longitudinal rod passes, the other end of each transverse rod being left straight, and said rods being long enough so that when dropped down to place the straight end will rest on the opposite longitudinal rod, as clearly shown in the drawing. These rods may be readily lifted up, as indicated in dotted lines in the drawing, and will readily drop back to place. They will also slide freely along the longitudinal rods, but will remain in any position in which they may be placed with sufficient firmness to support the plants.

8 denotes bottom cross-pieces, which may or may not be used between the side pieces of the uprights. These cross-pieces when used serve as braces at the bottom and preferably rest upon the top of the ground, so as to prevent the uprights from working down into the ground.

The mode of using my novel plant-supporting device is a matter wholly within the judgment of any florist. I have illustrated the uprights as placed in rows transversely to a long bed of plants and each side piece as provided with two clips to support longitudinal rods.

Having thus described my invention, I claim—

1. A device for supporting plants comprising U-shaped uprights each consisting of two side pieces and a top cross-piece, clips upon the side pieces, longitudinal rods held in place by the clips and transverse rods each of which is provided with an eye through which a longitudinal rod passes and the opposite end of which engages the opposite longitudinal rod.

2. A device for supporting plants comprising U-shaped uprights each consisting of two side pieces and a top cross-piece formed from a single strip of metal, clips upon the side pieces, longitudinal rods held in place by the clips and provided with backwardly-turned ends to retain them in place and bottom cross-pieces between the side pieces which are adapted to rest upon the top of the ground.

In testimony whereof I affix my signature in presence of two witnesses.

JAMES HORAN.

Witnesses:
HARRY HACKES,
JOSEPH FRANK.